US012612312B2

(12) United States Patent
Saripalli et al.

(10) Patent No.: US 12,612,312 B2
(45) Date of Patent: Apr. 28, 2026

(54) HYDRATED IONIC CLAY AND TOBACCO MATERIAL COMPOSITIONS

(71) Applicant: JUUL Labs, Inc., San Francisco, CA (US)

(72) Inventors: Anusha Saripalli, Santa Clara, CA (US); Krishnamohan Sharma, Milpitas, CA (US)

(73) Assignee: JUUL Labs, Inc., Washington, DC (US)

( * ) Notice: Subject to any disclaimer, the term of this patent is extended or adjusted under 35 U.S.C. 154(b) by 718 days.

(21) Appl. No.: 17/844,834

(22) Filed: Jun. 21, 2022

(65) Prior Publication Data

US 2022/0324715 A1      Oct. 13, 2022

Related U.S. Application Data

(63) Continuation of application No. PCT/US2020/065587, filed on Dec. 17, 2020.

(60) Provisional application No. 62/951,983, filed on Dec. 20, 2019.

(51) Int. Cl.
| | |
|---|---|
| *C01B 33/40* | (2006.01) |
| *A24B 15/167* | (2020.01) |
| *A24B 15/20* | (2006.01) |
| *A24B 15/24* | (2006.01) |

(52) U.S. Cl.
CPC ............ *C01B 33/40* (2013.01); *A24B 15/167* (2016.11); *A24B 15/243* (2013.01); *A24B 15/20* (2013.01)

(58) Field of Classification Search
CPC .......... A24B 15/30; A24B 15/302; A24B 3/14
See application file for complete search history.

(56) References Cited

U.S. PATENT DOCUMENTS

| | | | |
|---|---|---|---|
| 2,162,738 A | 6/1939 | Mccoy | |
| 2,938,818 A | 5/1960 | Specht | |
| 3,012,915 A | 12/1961 | Howard | |
| 3,847,326 A | 11/1974 | Webster | |

(Continued)

FOREIGN PATENT DOCUMENTS

| | | |
|---|---|---|
| CA | 622523 A | 6/1961 |
| CN | 102316850 A | 1/2012 |

(Continued)

OTHER PUBLICATIONS

Tomas, Helena et. al. "Laponite®: A Key Nanoplatform for Biomedical Applications?" Nanomedicine: Nanotechnology, Biology and Medicine, Elsevier, May 26, 2017, www.sciencedirect.com/science/article/pii/S1549963417300916. (Year: 2017).*

(Continued)

*Primary Examiner* — Michael H. Wilson
*Assistant Examiner* — Stephanie Lynn Moore
(74) *Attorney, Agent, or Firm* — Mintz, Levin, Cohn, Ferris, Glovsky and Popeo, P.C.

(57) ABSTRACT

Compositions made from combinations including an hydrated ionic clay and a tobacco material are described herein. Methods of manufacture, as well as methods of extracting nicotine from these compositions are also described. The compositions can be used to prepare liquid vaporizable materials by extracting nicotine from tobacco material and directly from the tobacco material and into a liquid vaporizable material.

20 Claims, 10 Drawing Sheets

Tobacco Leaf

Coating

Ionic Alkaline Clay (Laponite gel)    C-Leaf (Coated Leaf)

(56)  References Cited

U.S. PATENT DOCUMENTS

| | | | |
|---|---|---|---|
| 3,880,172 A | | 4/1975 | Anderson et al. |
| 4,147,172 A | * | 4/1979 | Calder ................ A24B 15/165 |
| | | | 131/359 |
| 5,525,351 A | | 6/1996 | Dam |
| 6,344,222 B1 | | 2/2002 | Cherukuri et al. |
| 7,040,314 B2 | | 5/2006 | Nguyen et al. |
| 7,581,540 B2 | | 9/2009 | Hale et al. |
| 8,356,606 B2 | | 1/2013 | Sengupta et al. |
| 8,402,978 B2 | | 3/2013 | Karles et al. |
| 8,485,180 B2 | | 7/2013 | Smutney et al. |
| 8,741,348 B2 | | 6/2014 | Hansson et al. |
| 8,893,724 B2 | | 11/2014 | Woodcock et al. |
| 10,195,345 B2 | | 2/2019 | Senior et al. |
| 10,328,443 B2 | | 6/2019 | Ricketts et al. |
| 10,609,958 B2 | | 4/2020 | Robinson et al. |
| 10,856,573 B2 | | 12/2020 | Pijnenburg et al. |
| 10,952,452 B2 | | 3/2021 | Sengupta et al. |
| 11,053,395 B2 | | 7/2021 | Karles et al. |
| 11,246,344 B2 | | 2/2022 | Griffith, Jr. et al. |
| 11,259,569 B2 | | 3/2022 | Hejazi |
| 2005/0056294 A1 | | 3/2005 | Wanna et al. |
| 2006/0032501 A1 | | 2/2006 | Hale et al. |
| 2006/0171990 A1 | | 8/2006 | Asgari |
| 2006/0191548 A1 | | 8/2006 | Strickland et al. |
| 2010/0006092 A1 | | 1/2010 | Hale et al. |
| 2011/0083681 A1 | | 4/2011 | Sengupta et al. |
| 2011/0232657 A1 | | 9/2011 | Karles et al. |
| 2012/0152264 A1 | | 6/2012 | Coleman et al. |
| 2012/0199149 A1 | | 8/2012 | Strickland et al. |
| 2013/0186418 A1 | | 7/2013 | Gao et al. |
| 2013/0255702 A1 | | 10/2013 | Griffith, Jr. et al. |
| 2014/0334802 A1 | * | 11/2014 | Dubief .................. A24F 40/485 |
| | | | 392/390 |
| 2015/0013693 A1 | | 1/2015 | Fuisz et al. |
| 2015/0068545 A1 | | 3/2015 | Moldoveanu et al. |
| 2016/0136153 A1 | | 5/2016 | Jenkins |
| 2016/0295910 A1 | | 10/2016 | Besso et al. |
| 2017/0071249 A1 | | 3/2017 | Ampolini et al. |
| 2017/0099877 A1 | | 4/2017 | Worm et al. |
| 2017/0251714 A1 | | 9/2017 | Mishra et al. |
| 2017/0265517 A1 | | 9/2017 | Swede et al. |
| 2017/0340005 A1 | | 11/2017 | Terao |
| 2018/0029782 A1 | | 2/2018 | Zuber et al. |
| 2018/0042302 A1 | | 2/2018 | Robinson et al. |
| 2018/0084823 A1 | | 3/2018 | Fuisz et al. |
| 2018/0199617 A1 | | 7/2018 | Iodice |
| 2018/0228203 A1 | | 8/2018 | Pithawalla et al. |
| 2018/0310624 A1 | | 11/2018 | Parker et al. |
| 2019/0183177 A1 | | 6/2019 | Hubbard et al. |
| 2021/0177039 A1 | | 6/2021 | Yao et al. |
| 2021/0315257 A1 | * | 10/2021 | Aoun ..................... A24B 15/14 |
| 2022/0211092 A1 | | 7/2022 | Arafat Arafat |
| 2022/0312841 A1 | | 10/2022 | Diokno et al. |
| 2023/0292814 A1 | | 9/2023 | Bagheri et al. |
| 2024/0260654 A1 | | 8/2024 | Ashraf et al. |

FOREIGN PATENT DOCUMENTS

| | | |
|---|---|---|
| CN | 108277085 A | 7/2018 |
| CN | 108366614 A | 8/2018 |
| CN | 109105944 A | 1/2019 |
| CN | 109310622 A | 2/2019 |
| CN | 111685388 A | 9/2020 |
| EP | 0135265 A2 | 3/1985 |
| EP | 0405190 A2 | 1/1991 |
| EP | 0509657 A1 | 10/1992 |
| EP | 0419974 B1 | 12/1996 |
| EP | 2077731 B1 | 8/2011 |
| EP | 2205105 B1 | 9/2012 |
| EP | 2645886 B1 | 4/2015 |
| EP | 2753197 B1 | 9/2015 |
| EP | 2552237 B1 | 10/2016 |
| EP | 2844088 B1 | 11/2016 |
| EP | 2741625 B1 | 4/2017 |
| EP | 2811849 B1 | 4/2018 |
| EP | 2552248 B1 | 9/2019 |
| EP | 2632562 B1 | 8/2020 |
| EP | 3089602 B1 | 9/2020 |
| EP | 3110264 B1 | 9/2020 |
| EP | 3481237 B1 | 9/2020 |
| EP | 3297460 B1 | 12/2020 |
| EP | 3110265 B1 | 2/2021 |
| EP | 3240442 B1 | 2/2022 |
| EP | 3240439 B1 | 6/2022 |
| EP | 3911390 B1 | 10/2022 |
| EP | 3846643 B1 | 11/2022 |
| EP | 3846644 B1 | 11/2022 |
| EP | 3860376 B1 | 5/2023 |
| GB | 1484573 A | 9/1977 |
| KR | 10-2016-0004298 A | 1/2016 |
| KR | 10-2019-0083314 A | 7/2019 |
| WO | WO-9312675 A2 | 7/1993 |
| WO | WO-9520330 A1 | 8/1995 |
| WO | WO-9530411 A1 | 11/1995 |
| WO | WO-2005007068 A1 | 1/2005 |
| WO | WO-2012026963 A2 | 3/2012 |
| WO | WO-2012134380 A1 | 10/2012 |
| WO | WO-2013030202 A1 | 3/2013 |
| WO | WO-2015179388 A1 | 11/2015 |
| WO | WO-2015193242 A2 | 12/2015 |
| WO | WO-2015197674 A1 | 12/2015 |
| WO | WO-2017046363 A1 | 3/2017 |
| WO | WO-2017075975 A1 | 5/2017 |
| WO | WO-2018122375 A1 | 7/2018 |
| WO | WO-2018224339 A1 | 12/2018 |
| WO | WO-2019015339 A1 | 1/2019 |
| WO | WO-2019048880 A1 | 3/2019 |
| WO | WO-2019071910 A1 | 4/2019 |
| WO | WO-2019086859 A1 | 5/2019 |
| WO | WO-2019129843 A1 | 7/2019 |
| WO | WO-2019193209 A1 | 10/2019 |
| WO | WO-2019193311 A1 | 10/2019 |
| WO | WO-2020025718 A1 | 2/2020 |
| WO | WO-2021026443 A1 | 2/2021 |

OTHER PUBLICATIONS

Chan, et al. (May 2009), Prediction Models for Shape and Size of ca-Alginate Macrobeads Produced Through Extrusion-Dripping Method, Journal of Colloid and Interface Science 338(1):63-72.

* cited by examiner

*Clay 1 - RDS; Clay 2 - RD

Tobacco Leaf

Coating

Ionic
Alkaline Clay    C-Leaf (Coated Leaf)
(Laponite gel)

Tobacco – Ionic Clay Mixture
(Powdered Tobacco Material – Ionic Clay Mixture)

| SNo. | Chemicals and Compositions | Average pH |
|------|----------------------------|------------|
| 1 | Propylene Glycol (PG) | 6.2 |
| 2 | Vegetable Glycerin (VG) | 5.6 |
| 3 | PG/VG(70/30) | 5.5 |
| 4 | PG/VG(70/30) + 0.5 ml Water | 5.3 |
| 5 | PG/VG(30/70) | 5.1 |
| 6 | PG/VG(30/70) + 0.5 ml Water | 5.0 |
| 7 | Burley Tobacco | 5.8 |
| 8 | PG/VG(30/70) + 0.5 ml Water + Tobacco Laponite Pellets | 6.1 |
| 9 | Tobacco - Ionic Clay RD Formulation | 5.9 |
| 10 | Tobacco - Ionic Clay EP Formulation | 6.1 |
| 11 | Tobacco - Ionic Clay RDS Formulation | |

FIG. 6

Laponite Tobacco
Formulation at 70° C

HYDRATED IONIC CLAY AND TOBACCO MATERIAL COMPOSITIONS

CROSS-REFERENCE TO RELATED APPLICATIONS

The present application is a continuation application, filed under 35 U.S.C. § 120, of International Patent Application No. PCT/US2020/065587 entitled "Hydrated Ionic Clay and Tobacco Material Compositions," with an International Filing Date of Dec. 17, 2020, which claims priority to U.S. Provisional Patent Application No. 62/951,983 entitled "Hydrated Ionic Clay and Tobacco Material Compositions" filed on Dec. 20, 2019, each of which is hereby incorporated by reference in its entirety.

TECHNICAL FIELD

The subject matter described herein relates to compositions made from combinations that include hydrated ionic clay and plant material, such as a tobacco, and methods of extracting nicotine therefrom.

BACKGROUND

Vaporizer devices, which can also be referred to as vaporizers, electronic vaporizer devices, e-vaporizer devices or aerosolization devices, can be used for delivery of an aerosol (for example, a vapor-phase and/or condensed-phase material suspended in a stationary or moving mass of air or some other gas carrier) containing one or more active ingredients by inhalation of the aerosol by a user of the vaporizing device. For example, electronic nicotine delivery systems (ENDS) include a class of vaporizer devices that are battery powered and that can be used to simulate the experience of smoking, but without burning of tobacco or other substances. Vaporizers are gaining increasing popularity both for prescriptive medical use, in delivering medicaments, and for consumption of tobacco and other plant-based materials. Vaporizer devices can be portable, self-contained, and/or convenient for use.

In use of a vaporizer device, the user inhales an aerosol, colloquially referred to as "vapor," which can be generated by a heating element that vaporizes (e.g., causes a liquid or solid to at least partially transition to the gas phase) a vaporizable material, which can be liquid, a solution, a solid, semisolids, a paste, a wax, and/or any other form compatible for use with a specific vaporizer device. The vaporizable material used with a vaporizer can be provided within a cartridge (for example, a separable part of the vaporizer device that contains vaporizable material) that includes an outlet (for example, a mouthpiece) for vapor delivery and inhalation of the aerosol by a user.

A typical approach by which a vaporizer device generates an inhalable aerosol from a vaporizable material involves heating the vaporizable material in a vaporization chamber (or a heater chamber) to cause the vaporizable material to be converted to the gas (or vapor) phase. A vaporization chamber generally refers to an area or volume in the vaporizer device within which a heat source (e.g., conductive, convective, and/or radiative) causes heating of a vaporizable material to produce a mixture of air and vaporized vaporizable material to form a vapor for inhalation by a user of the vaporization device.

Various vaporizable materials having a variety of contents and proportions of such contents can be contained in the cartridge. Some vaporizable materials, for example, may have a smaller percentage of active ingredients per total volume of vaporizable material, such as due to regulations requiring certain active ingredient percentages. As a result, a user may need to vaporize a large amount of vaporizable material (e.g., compared to the overall volume of vaporizable material that can be stored in a cartridge) to achieve a desired effect.

In order to prepare a vaporizable material, nicotine can be extracted from tobacco or other plants and then added to a suitable carrier. One such method of extracting nicotine from tobacco is disclosed in U.S. Pat. No. 2,162,738. The process disclosed therein involves extractions using ammonium hydroxide, followed by naphtha or gasoline, and a final treatment with sulfuric acid. If a portion of these harsh chemicals remained with the nicotine, it would make it unsuitable for incorporation into a vaporizable material. In addition, these extraction chemicals may not be environmentally friendly and could be difficult to dispose of after use. This extraction method may also extract undesirable compounds from the tobacco, and require extensive purification techniques to isolate the nicotine.

Assuming the nicotine is free of contaminants, it can be added to a humectant such as propylene glycol (PG), vegetable glycerin (VG), or a mixture of PG and VG (PG/VG) to form a vaporizable material. The humectant forms a solution with the nicotine and forms an aerosol after vaporization. The amount of nicotine in the vaporizable material can be adjusted by adding more or less humectant. Other additives can be incorporated into the vaporizable material such as flavorings.

SUMMARY

In certain aspects of the current subject matter, liquid vaporizable materials suitable for use in electronic vaporizer devices can be prepared by inclusion of one or more of the features described herein or comparable/equivalent approaches as would be understood by one of ordinary skill in the art. Aspects of the current subject matter relate to methods and systems extracting nicotine from tobacco or other plant material and preparing liquid vaporizable materials. In one aspect, a method of extracting nicotine from tobacco material and directly into a liquid vaporizable material is described.

In some variations, one or more of the following features may optionally be included in any feasible combination. In certain aspects of the current subject matter, a composition including a hydrated ionic clay and a tobacco material is disclosed. In certain aspects of the current subject matter, a device comprising a heating element configured to heat the composition of any one of the preceding claims to deliver nicotine or a salt thereof to a user. In certain aspects of the current subject matter, a method of extracting nicotine is disclosed. The method of extracting nicotine from tobacco material includes contacting tobacco material with hydrated ionic clay to form a composition, and contacting the composition with a solvent to extract the nicotine from the tobacco material.

In other aspects of the current subject matter, a method of extracting nicotine is disclosed. Tobacco material is ground to form powdered tobacco material. Ionic clay is mixed with a first amount of water to form a first dispersion. The powdered tobacco material is mixed with the first dispersion to form a second dispersion. A portion of the first amount of water from the second dispersion is evaporated to form a loose cake. The loose cake is compressed to form a pellet. The pellet is immersed in a first solution including a glycol and a glycerol. A second amount of water is added to the first solution to form a second solution, the second solution containing the nicotine extracted from the pellet.

In certain aspects of the current subject matter, a method of manufacturing a pellet containing tobacco material is disclosed. The method includes grinding tobacco material to form a powdered tobacco material. A hydrated ionic clay is mixed with a first amount of water to form a first dispersion. The powdered tobacco material is mixed with the first dispersion to form a second dispersion. A portion of the first amount of water is evaporated from the second dispersion to form a loose cake. The loose cake is compressed to form the pellet containing tobacco material.

In certain aspects of the subject matter, the tobacco formulation comprising hydrated ionic clays, optionally formulated with humectants such as vegetable glycerin and glycols, organic acids, flavoring agents including both natural and artificial, is subjected to temperatures in the 100° C. to 400° C. range, preferably in 150° C. to 300° C. range, to generate a vapor.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 6 presents a table of pH data for multiple chemicals and compositions.

When practical, similar reference numbers denote similar structures, features, or elements.

DETAILED DESCRIPTION

Figure 1:
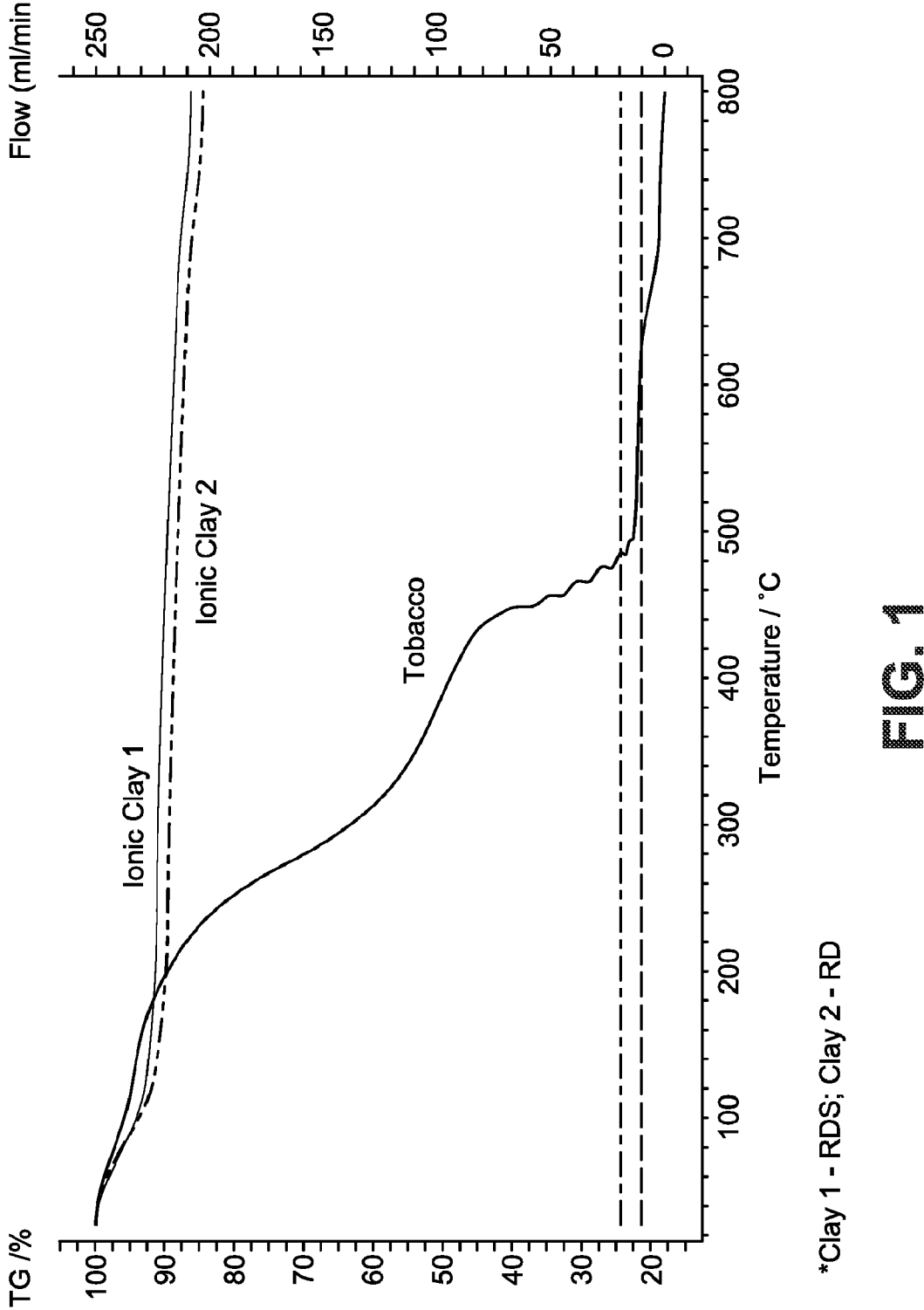
FIG. 1 illustrates a graph of the thermal stability of hydrated ionic clays and Burley tobacco.

Implementations of the current subject matter include compositions and methods of preparing hydrated ionic clay and tobacco material compositions. The hydrated ionic clay and tobacco material compositions can be formed into a mass, such as a pellet, sheet, brick, bead, tablet, powder, semi-solid, loose cake, granulation, free flowing powder, plug, cylinder, porous rod, or other suitable shape including hollow forms with various porous structures or a coating. In other implementations, hydrated ionic clay and tobacco material compositions are in a form of a loose, powdered mixture of the hydrated ionic clay and the powdered tobacco material.

Implementations of the current subject matter also include systems and methods of extracting active ingredients (e.g. nicotine) from tobacco material and preparing vaporizable materials that may be liquid, a solution, a solid, semi-solid, loose cake, a wax, or other form as may be compatible with use of a specific vaporizer device. In implementations, the vaporizable material is a liquid comprising nicotine and a humectant that is vaporized and forms an aerosol using a vaporizer. Vaporizer is used generically in the following description to refer to a vaporizer device. Examples of vaporizers consistent with implementations of the current subject matter include electronic vaporizers, combustible vaporizers, or the like. Such vaporizers are generally portable, hand-held devices that heat a vaporizable material to provide an inhalable dose of the vaporizable material.

The vaporizable material used with a vaporizer may optionally be provided within a cartridge (e.g., a part of the vaporizer that contains the vaporizable material in a reservoir or other container and that can be refillable when empty or disposable in favor of a new cartridge containing additional vaporizable material of a same or different type). A vaporizer may be a cartridge-using vaporizer, a cartridge-less vaporizer, or a multi-use vaporizer capable of use with or without a cartridge. For example, a multi-use vaporizer may include a heating chamber (e.g., an oven) configured to receive a vaporizable material directly in the heating chamber and also to receive a cartridge or other replaceable device having a reservoir, a volume, or the like for at least partially containing a usable amount of vaporizable material.

In various implementations, a liquid vaporizable material (e.g., a carrier solution in which an active and/or inactive ingredient(s) are suspended or held in solution or a neat liquid form of the vaporizable material itself) can be prepared. A liquid vaporizable material can likewise be capable of being completely vaporized or can include some part of the liquid material that remains after all of the material suitable for inhalation has been consumed.

In various implementations, nicotine is extracted from tobacco material into a humectant. In other words, nicotine is extracted directly from tobacco material (e.g. powdered tobacco within the hydrated ionic clay and tobacco composition), and into solution with a humectant such as a PG/VG mixture. In this manner, the nicotine extraction process avoids the need for a separate extraction process to obtain the nicotine, which would in turn be added into a humectant. Natural extraction of nicotine, alkaloids, and flavoring agents directly into PG/VG may eliminate the need for formulating an e-liquid with synthetic nicotine and flavoring agents. Additional flavors or additives to customize the extractant formulation can be added, if required. Implementations according to the present process also avoid the need for subsequent purification of a tobacco material extract to obtain the nicotine, which may be required step for other extraction processes. Implementations according to the present process also avoid the use of harsh or toxic chemicals that can contaminate the nicotine and ultimately the vaporizable material. Implementations according to the present process also avoid the need for high temperature extraction processes, or high temperature purification processes, since the nicotine can be extracted from the tobacco material at standard conditions (i.e. room temperature, standard pressure). Without being bounded to any particular theory, it is believed that implementations according to the present process selectively extract nicotine/alkaloids from a tobacco material while avoiding the extraction of undesirable, higher molecular weight compounds, as compared to other extraction processes.

Various implementations include the release of nicotine at lower temperatures into a vapor form. Various implementations include permeating water into a tobacco structure for migration of nicotine/alkaloids. Various implementations include release of nicotine in final product in the pH range of 5 to 8. Various implementations include release of nicotine from tobacco into a gel matrix. Various implementations include release of nicotine into viscous liquids or semi solids or hydrogels. Various implementations include pre-heating of the product to improve nicotine release efficiency at low temperatures. Various implementations include use of clays as binders to modify the bulk density, rod density, porosity, flow properties, compressibility, thermal conductivity, form factors, moldability, processability, and manufacturability of a composition. Various implementations include compositions comprising a thermally stable clay and like materials, which optionally do not release any organic materials below 300° C. Various implementations enable multiple heating element designs and form factors to make it compact and energy efficient. Various implementations include wetting agents or humectants along with ionic clays.

Implementations according to the present disclosure are suitable for industrial scale extraction of nicotine from tobacco material. Implementations according to the present disclosure are suitable for in situ extraction of nicotine from tobacco material within a personal-sized, vaporization device.

In order to facilitate the release or extraction of nicotine from the tobacco material, a hydrated ionic clay is added to the tobacco material. Without being bounded to any particular theory, it is believed that the hydrated ionic clay in the hydrated ionic clay and tobacco material composition facilitates an nicotine exchange process that allows nicotine to be released from the tobacco material. In this manner, nicotine is released from the tobacco material and migrates to a surface of a tobacco material/hydrated ionic clay matrix. The nicotine may be stabilized on the surface of the matrix by hydrogen bonding and/or ionic bonding. Alternately, without bound by the theory, it is possible that tobacco/hydrated ionic clay create acid/base junction in solid phase or pH gradient, and it is possible that the presence of polar solvents such as water could transport nicotine to the intersection of tobacco/hydrated ionic clay from the interior of tobacco. From the surface of the matrix, the nicotine can be extracted into a humectants to form e-liquids, or heated (optionally in presence of humectants) to form an aerosol containing nicotine. The nicotine transport process occurs within the tobacco material/hydrated ionic clay matrix. Also under the basic conditions, bound nicotine is converted to free base nicotine. However, it is understood that protonated and freebase nicotine may exist in equilibrium, and that the composition of each formed inside tobacco is governed by the localized pH. When extracted from the tobacco, the equilibrium of protonated and freebase nicotine dynamically change or switch based on environmental conditions of the tobacco material/hydrated ionic clay matrix and temperature. Increasing the temperature increases the rate of nicotine release from tobacco material/hydrated ionic clay matrix, as well as increasing the rate of extraction of the nicotine into the humectant. The addition of water can facilitate the nicotine/ion exchange process and release of nicotine to the surface of the matrix. The addition of water can also facilitate the release of nicotine from the tobacco material at lower temperatures as compared to the absence of added water. However, the mobility of the nicotine release may be impacted by structured water versus free water differently.

In implementations, the composition comprises a hydrated ionic clay and a tobacco material. The composition can comprise the hydrated ionic clay in an amount between 1 wt % to 5 wt % of the composition, and any subranges therebetween. The composition can comprise the hydrated ionic clay in an amount between 1 wt % to 4 wt % of the composition, and any subranges therebetween. The composition can comprise the hydrated ionic clay in an amount between 1 wt % to 5 wt % of the composition, and any subranges therebetween. The composition can comprise the hydrated ionic clay in an amount between 1 wt % to 2 wt % of the composition, and any subranges therebetween. The composition can comprise the hydrated ionic clay in an amount between 0.1 wt % to 5 wt % of the composition, and any subranges therebetween. The composition can comprise the hydrated ionic clay in an amount between 0.1 wt % to 10 wt % of the composition, and any subranges therebetween. The composition can comprise the tobacco material in an amount between 40 wt % to 99 wt % of the composition, and any subranges therebetween. The composition can comprise the tobacco material in an amount between 40 wt % to 90 wt % of the composition, and any subranges therebetween. The composition can comprise the tobacco material in an amount between 40 wt % to 80 wt % of the composition, and any subranges therebetween. The composition can comprise the tobacco material in an amount between 40 wt % to 70 wt % of the composition, and any subranges therebetween. The composition can comprise the tobacco material in an amount between 40 wt % to 60 wt % of the composition, and any subranges therebetween. The composition can comprise the tobacco material in an amount between 40 wt % to 50 wt % of the composition, and any subranges therebetween. The composition can comprise the tobacco material in an amount between 50 wt % to 90 wt % of the composition, and any subranges therebetween. The composition can comprise the tobacco material in an amount between 50 wt % to 80 wt % of the composition, and any subranges therebetween. The composition can comprise the tobacco material in an amount between 50 wt % to 70 wt % of the composition, and any subranges therebetween. The composition can comprise the tobacco material in an amount between 50 wt % to 60 wt % of the composition, and any subranges therebetween. The composition can comprise the tobacco material in an amount between 80 wt % to 99 wt % of the composition, and any subranges therebetween. The composition can comprise the tobacco material in an amount between 90 wt % to 99 wt % of the composition, and any subranges therebetween. In implementations, the composition further comprises water. The composition can comprise the water in an amount between 5 wt % to 50 wt % of the composition, and any subranges therebetween. The composition can comprise the water in an amount between 5 wt % to 40 wt % of the composition, and any subranges therebetween. The composition can comprise the water in an amount between 5 wt % to 30 wt % of the composition, and any subranges therebetween. The composition can comprise the water in an amount between 5 wt % to 20 wt % of the composition, and any subranges therebetween. The composition can comprise the water in an amount between 5 wt % to 15 wt % of the composition, and any subranges therebetween. The composition can comprise the water in an amount between 10 wt % to 40 wt % of the composition, and any subranges therebetween. The composition can comprise the water in an amount between 10 wt % to 30 wt % of the composition, and any subranges therebetween. The composition can comprise the water in an amount between 10 wt % to 20 wt % of the composition, and any subranges therebetween. The composition can comprise the water in an amount between 10 wt % to 15 wt % of the composition, and any subranges therebetween. The composition can comprise the water in an amount between 1 wt % to 10 wt % of the composition, and any subranges therebetween. The composition can comprise the water in an amount between 1 wt % to 5 wt % of the composition, and any subranges therebetween. The composition can comprise the water in an amount between 0.1 wt % to 10 wt % of the composition, and any subranges therebetween. The composition can comprise the water in an amount between 2 wt % to 6 wt % of the composition, and any subranges therebetween. The composition can comprise the hydrated ionic clay and the tobacco material in any of the aforementioned amounts, except in combinations where such amounts are mutually exclusive. The composition can comprise the hydrated ionic clay, the tobacco material, and water in any of the aforementioned amounts, except in combinations where such amounts are mutually exclusive.

In implementations, the composition comprises a hydrated ionic clay, a tobacco material, and water. The composition can comprise the hydrated ionic clay in an amount between 1 wt % to 5 wt %, the tobacco material in an amount between 40 wt % to 99 wt %, and the water in an amount between 5 wt % to 50 wt % of the composition. The composition can comprise the hydrated ionic clay in an amount between 1 wt % to 4 wt %, the tobacco material in an amount between 50 wt % to 90 wt %, and the water in an amount between 5 wt % to 40 wt % of the composition. The composition can comprise the hydrated ionic clay in an amount between 1 wt % to 3 wt %, the tobacco material in an amount between 60 wt % to 90 wt %, and the water in an amount between 5 wt % to 30 wt % of the composition. The composition can comprise the hydrated ionic clay in an amount between 1 wt % to 3 wt %, the tobacco material in an amount between 50 wt % to 90 wt %, and the water in an amount between 10 wt % to 30 wt % of the composition.

In implementations, the hydrated ionic clay is a synthetic layered material carrying either a negative charge or a positive charge. The hydrated ionic clay can be an anionic layered alkaline clay. The hydrated ionic clay can comprise silicates. The hydrated ionic clay can comprise alkali and/or alkaline earth metal silicates. The hydrated ionic clay can be a magnesium silicate clay. The hydrated ionic clay can be a sodium magnesium silicate clay. The hydrated ionic clay can be a synthetic trioctahedral clay mineral. The hydrated ionic clay comprises aluminates, titanates and/or zirconates. The hydrated ionic clay can be an aluminate, such as layered double hydroxide carrying net positive charge. The hydrated ionic clay can be a synthetic phyllosilicate. The synthetic phyllosilicate can be a lithium magnesium sodium orthosilicate. The hydrated ionic clay can comprise phosphates. The synthetic phyllosilicate can be an inorganic composition comprising hydrogen, lithium, magnesium, sodium, oxygen, and silicon. The inorganic composition is dilithium; hexadecamagnesium; disodium; 1,3,5,7-tetraoxido-2,4,6,8,9,10-hexaoxa-1,3,5,7-tetrasilatricyclo[3.3.1.13,7]decane; dodecahydroxide. The hydrated ionic clay can include an additive within the clay matrix. The hydrated ionic clay can be Laponite. Laponite, also known as hectorite, is a synthetic, colloidal, layered silicate manufactured from naturally occurring minerals. Laponite, an inorganic polymer, has higher gelling strength and can hold more tobacco material than natural clays. Laponite is available in multiple different grades. The hydrated ionic clay is a gel forming grade, e.g. a gel forming grade of Laponite. The hydrated ionic clay is a gel forming grade, e.g. a sol forming grade of Laponite.

Water can be added to the ionic clay to form a hydrated ionic clay. A portion of the water in the hydrated ionic clay can be bound within the crystalline lattice, with any excess water being free moisture. The hydrated ionic clay may have a surface hydroxyl concentration contributing to localized negative charges. Other moieties including silicon oxides may also contribute to the hydrated ionic clay's anionic properties. $Mg2+$, $Li+$, $K+$, and $Na+$ ions may contribute to a localized positive charges, and also serve as exchangeable cations for the hydrated ionic clay. The charged nature and the interlayer space within the hydrated ionic clay can provide for adsorption of organic molecules.

In implementations, the tobacco material includes one or more types of tobacco. The tobacco material can be a single type of tobacco or a blend. Any variety of tobacco can be used including, but not limited to, Aromatic Fire-cured, Brightleaf, Burley, Cavendish, Corojo, Criollo, Dokha, Ecuadorian Sumatra, Habano, Kasturi, Latakia, Maduro, Oriental, Perique, Shade, Thuoc lao, Type 22, Virginia, White Burley, Wild, Y1, and the like. The tobacco material may be dry-ice expanded tobacco (DIET), flue-cured tobacco, and/or air-cured tobacco.

In implementations, the composition is contained within a cartridge. In implementations, the composition is heated in a device comprising a heating element configured to heat the composition to deliver nicotine or a salt thereof to a user. The device can be an electronic nicotine delivery system.

FIG. 1 shows a graph of the thermal stability of two grades of Laponite and Burley tobacco material. The initial weight loss at 100° C. of the Laponite is attributable to the loss of the free water. In all, the Laponite loses less than about 10% of its weight up to 600° C., with almost all of the weight loss being water. On the other hand, tobacco loses 60% of its weight before reaching 400° C. Hydrated ionic clays, such as Laponite, are non-flammable and thermally stable at temperatures below 800° C.

In implementations, the hydrated ionic clay (e.g. Laponite) is gel forming grade the forms a high viscosity colloidal dispersion with water. In implementations, the hydrated ionic clay is sol forming grade the forms a low viscosity colloidal dispersion with water. While the actual viscosity of the colloidal dispersion depends on the amount of hydrated ionic clay used in the dispersion, the aforementioned high and low viscosity descriptors refer to relative viscosities at a given concentration.

Laponite forms an alkaline dispersion that has a basic pH value, with many of the dispersions having a pH value between 9 and 10. It is believed that all grades of Laponite that have a basic pH can be used in the formulation. However, Laponites could be stabilized to neutral or lower pH by adding acids, for example, to create dispersions having a final pH value of the range from 5 to 12. The acids can be organic acids such as carboxylic acids or inorganic acids such as phosphoric acid.

In implementations, the tobacco leaves are dried or cured to remove excess moisture and break down chemical compounds. Methods of drying or curing tobacco material include air drying, oven drying, flame-curing, convective drying, vacuum drying, free drying, and combinations thereof. Any type of tobacco material is generally suitable for use according the methods and systems disclosed herein. In implementations, the tobacco material is a Burley tobacco.

Before use, the hydrated ionic clay is hydrated. For example, a quantity of hydrated ionic clay is measured and added to warm water. The water may be heated to a temperature of 40° C. to 80° C. Heating the water helps the rate at which the hydrated ionic clay disperses in the water. The composition can be mixed by stirring until a uniform dispersion is achieved.

Figure 2:
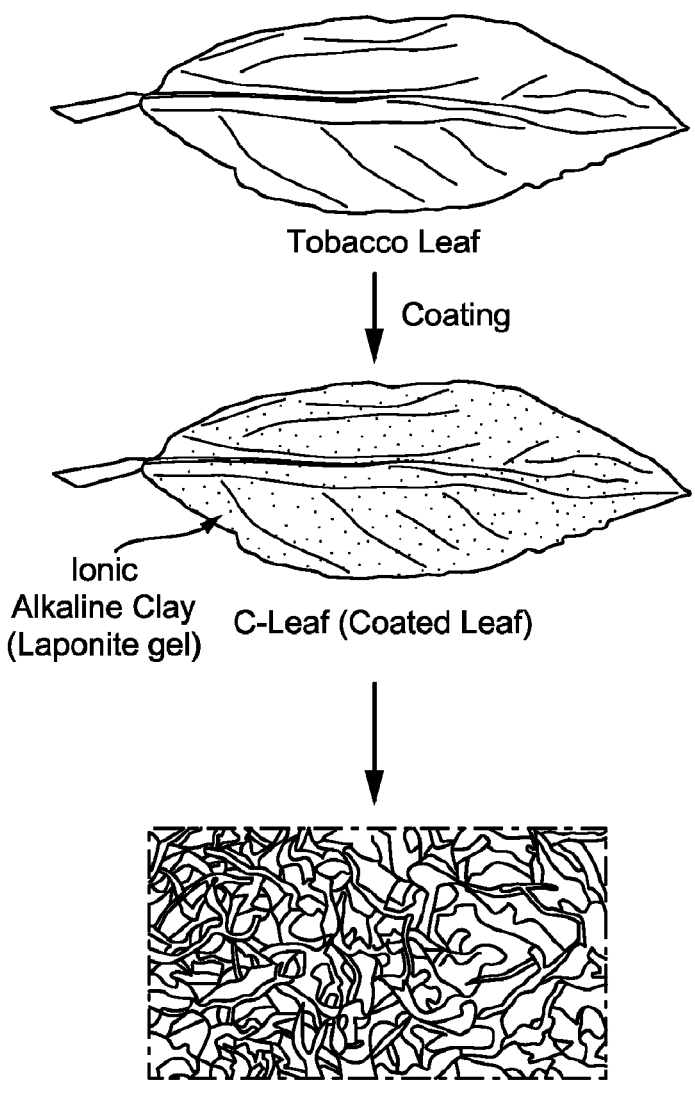
FIG. 2 illustrates a tobacco leaf coated with hydrated ionic clay.

In implementations, whole tobacco leaves are coated with hydrated ionic clay as shown in FIG. 2. Coating the whole tobacco leaf can be completed before or after the aforementioned drying process. The hydrated ionic clay coating can be applied by a spraying process, contact process (e.g. brushing) or by dipping the leaf in a hydrated ionic clay dispersion. Coating the tobacco leaf with hydrated ionic clay prior to a drying or curing process can avoid multiple drying steps and facilitate the breakdown of chemical compounds. Coating the whole tobacco leaf with hydrated ionic clay can also be accomplished a minimal need for capital investment in equipment. After coating with the hydrated ionic clay, the tobacco leaf can be rolled, cut, pulverized, and/or ground into a powder.

In implementations, a method of manufacturing a pellet (or other compressed form) containing tobacco material comprises grinding tobacco material to form a powdered tobacco (particle size distribution may range from 50 to 5000 microns) material, mixing a hydrated ionic clay with a first amount of water to form a first dispersion, mixing the powdered tobacco material with the first dispersion to form a second dispersion, evaporating a portion of the first amount of water from the second dispersion to form a loose cake, and compressing the loose cake to form the pellet containing tobacco material. In an initial step, the tobacco leaves are ground to form a powdered tobacco material. In implementations, the tobacco leaves coated with hydrated ionic clay are ground to form a powdered tobacco material and hydrated ionic clay composition. Grinding increases the surface area of the tobacco material and aids in the nicotine release and extraction process. In implementations, the tobacco material is finely ground so that the resulting powder passes through a 5 mm mesh sieve. In implementations, the tobacco material is finely ground so that resulting powder passes through a 4 mm mesh sieve. In implementations, the tobacco material is finely ground so that the resulting powder passes through a 3 mm mesh sieve. In implementations, the tobacco material is finely ground so that the resulting powder passes through a 2 mm mesh sieve. In implementations, the tobacco material is finely ground so that the resulting powder passes through a 1 mm mesh sieve. In implementations, the tobacco material is finely ground so that the resulting power passes through a 0.5 mm mesh sieve. In implementations, the tobacco material is finely ground so that the resulting powder has a particle size in the range of 50 microns to 2000 microns. In implementations, the tobacco material is finely ground so that the resulting powder has a particle size in the range of 100 microns to 300 microns.

Hydrated ionic clay is mixed with a first amount of water to form a first dispersion/hydrogel, and then the powdered tobacco material is added and mixed to form a second dispersion. The first dispersion can have an adjusted pH value of between 5 and 12. The first dispersion can have a pH value of between 9 and 11. The first dispersion can have a pH value of between 9 and 10. The first amount of water can be heated, for example to a temperature of 40° C. to 80°

C. Mixing the hydrated ionic clay with the first amount of water can includes stirring the first dispersion until uniform.

The second dispersion of hydrated ionic clay, water, and powdered tobacco material can be mixed until a uniform dispersion is achieved. A ratio of powdered tobacco material to the hydrated ionic clay in the second dispersion can be greater than 1 to 1. A ratio of powdered tobacco material to the hydrated ionic clay in the second dispersion can be greater than 2 to 1. A ratio of powdered tobacco material to the hydrated ionic clay in the second dispersion can be from 1 to 1 to 15 to 1, including any subrange therebetween.

After mixing, a portion of the water is removed from the second dispersion. In implementations, heat is used to evaporate water from the second dispersion. In implementations, a vacuum over is used to evaporate water from the second dispersion. In implementations, a filter is used to remove excess water. In implementations, a centrifuge is used to remove excess water. In implementations, freeze drying can be used to remove excess water. In implementations, combinations of filtering, centrifugation, and/or heating are used to remove excess water.

Figure 3:
FIG. 3 illustrates a tobacco powder and hydrated ionic clay composition.
Figure 4:
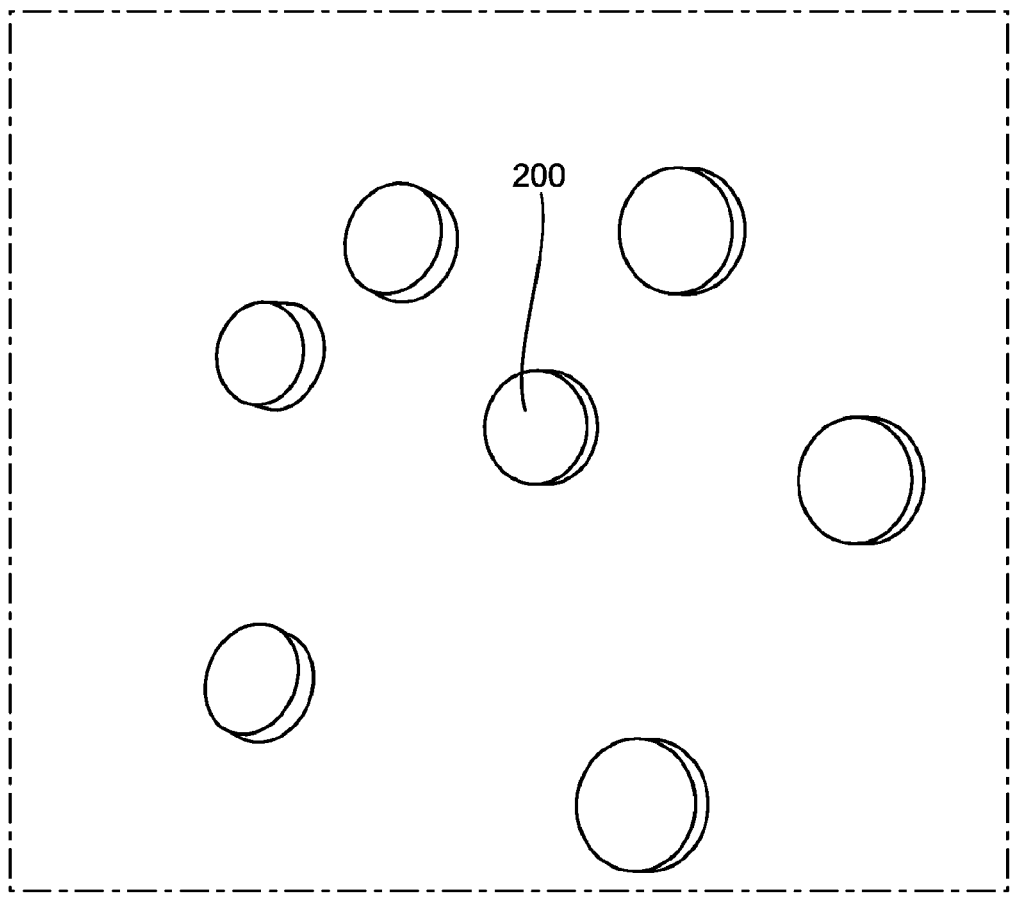
FIG. 4 shows a plurality of pellets formed from powdered tobacco material and hydrated ionic clay.

After removing a portion of the excess water, a loose cake is formed. FIG. 3 shows a powdered tobacco material and hydrated ionic clay composition with a portion of the water removed to form a loose cake. The loose cake can be compressed to form a pellet. In implementations, the press is a hand press, a tablet press, a punch press, a stamping press, a fly press, hydraulic press, manual press, or other suitable compressive device. After pressing, the pellet 200 is removed from the press 100. FIG. 4 shows a plurality of pellets 200 formed from a loose cake.

Pellet 200 can optionally be further dried using the methods discussed above concerning drying the tobacco. Pellet 200 can optionally be humidified to achieve the desired moisture content. In implementations, pellet 200 has a moisture content of about 10 wt % to about 40 wt %. In implementations, pellet 200 has a moisture content of about 15 wt % to about 40 wt %. In implementations, pellet 200 has a moisture content of about 20 wt % to about 40 wt %. In implementations, pellet 200 has a moisture content of about 30 wt % to about 40 wt %. In implementations, pellet 200 has a moisture content of about 10 wt % to about 35 wt %. In implementations, pellet 200 has a moisture content of about 10 wt % to about 30 wt %. In implementations, pellet 200 has a moisture content of about 10 wt % to about 25 wt %. In implementations, pellet 200 has a moisture content of about 10 wt % to about 20 wt %. In implementations, pellet 200 has a moisture content of about 15 wt % to about 35 wt %. In implementations, pellet 200 has a moisture content of about 20 wt % to about 30 wt %. In implementations, pellet 200 has a moisture content of about 5 wt % to about 10 wt %. In implementations, pellet 200 has a moisture content of less than about 10 wt %. In implementations, pellet 200 has a moisture content of about 1 wt % to about 10 wt %.

In implementations, a method of extracting nicotine from tobacco material comprises contacting tobacco material with a hydrated ionic clay to form a composition, and contacting the composition with a solvent to extract the nicotine from the tobacco material. The solvent can be an organic solvent. The solvent can be a humectant. For example, the solvent can be a solution of propylene glycol and/or vegetable glycerin. The solvent can contain water.

Pellet 200 is immersed in a first solution (i.e. a humectant solution) including a glycol and a glycerol. In implementations, the first solution has a pH value of between 3 and 7. In implementations, the first solution has a pH value of between 4 and 6.5. In implementations, the first solution has a pH value of between 5 and 6. In implementations, the first solution comprises a ratio of vegetable glycerin (VG) to propylene glycol (PG). The ranges of the ratio can vary between a ratio of about 100:0 VG to PG and a ratio of about 50:50 vegetable glycerol to propylene glycol. The ranges of the ratio can also vary between a ratio of about 50:50 vegetable glycerol to propylene glycol and a ratio of about 0:100 VG to PG. The difference in preferred ratios within the above stated ranges may vary by as little as 1, for example, said ratio may be about 99:1 vegetable glycerol to propylene glycol. However, more commonly said ratios would vary in increments of 15, for example, about 95:5 vegetable glycerol to propylene glycol; or about 85:15 vegetable glycerol to propylene glycol; or about 70:30 vegetable glycerol to propylene glycol; or about 55:45 vegetable glycerol to propylene glycol; or about 40:60 vegetable glycerol to propylene glycol; or about 25:75 vegetable glycerol to propylene glycol; or about 10:90 vegetable glycerol to propylene glycol. In preferred implementations, the first solution will be between the ratios of about 30:70 vegetable glycerol to propylene glycol, or about 70:30 vegetable glycerol to propylene glycol. The blends with varying ratios are selected for consumers with varying preferences, and based on the vaporization device.

Water can be added to the first solution to form a second solution, which is also a humectant solution. Without being bounded to any particular theory, it is believed that water helps drive the release of nicotine from the pellet and into the solution. The hydrated ionic clay in water has a pH value in the range of about 8 to about 12. By adding a small amount of water to the second solution containing the pellet, the water contacts the pellet to increase the localized pH of the hydrated ionic clay in contact with the powered tobacco material. In this manner, the nicotine in the pellet is released and extracted under a localized acidic/basic condition and then mixes into the second solution. The added water may also help transport the nicotine to the surface of the pellet where it can mix with the solution or a gel matrix surrounding it, the heating of which may release nicotine aerosols.

Figure 5A:
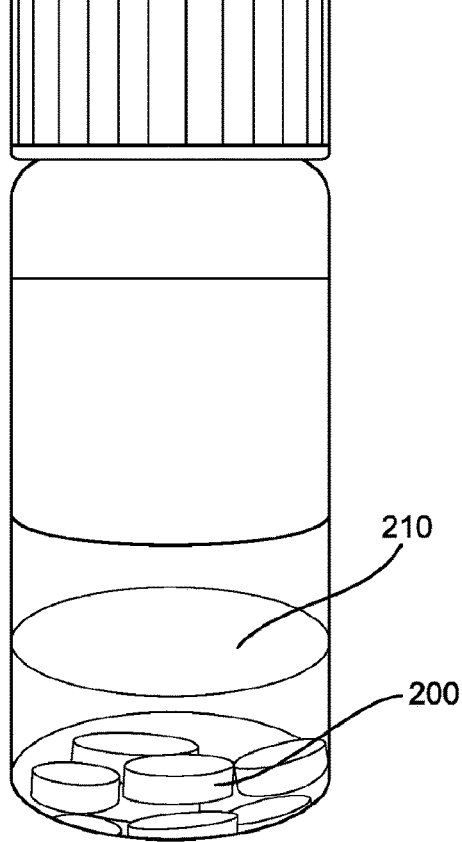
FIG. 5A shows pellet in a PG/VG/water solution at 0 hours.
Figure 5B:
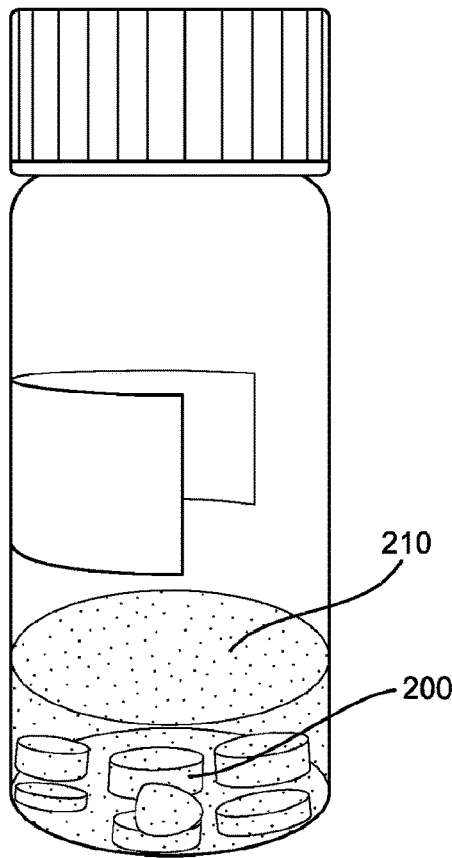
FIG. 5B shows pellet in a PG/VG/water solution after about 24 hours.

FIG. 5A shows pellet 200 in the second solution 210 after about 0 hours. FIG. 5B shows pellet 200 in the second solution 210 after about 24 hours. The pellets 200 retain their shape in the second solution. The darker color of the second solution 210 in FIG. 5B indicates a high degree of extraction from the pellet 200 including higher amounts of nicotine present in the second solution 210 (also confirmed by GC-FID (Gas Chromatography/Flame-Ionization Detection) is a good general detector for organic compounds in GC that detects the amount of carbon, however in some cases the color change may not be a direct indication of nicotine extraction). In implementations, the second solution has a pH value of between 5 and 7. In implementations, the second solution has a pH value of between 5 and 6. In implementations, the second solution has a pH value of between 6 and 7.

After a desired amount of nicotine is extracted from the pellet, the second solution can be used as a vaporizable material in a vaporization device. In implementations, flavorings can be added to the vaporizable material. These flavorings may include enhancers comprising cocoa solids, licorice, tobacco or botanical extracts, and various sugars, to name but a few. In implementations, acids can be added to the vaporizable material. These acids may include carboxylic acids such as benzoic acid, pyruvic acid, salicylic acid, levulinic acid, malic acid, maleic acid, lactic acid, succinic acid, citric acid, and combinations thereof.

FIG. 6 is a graph presenting the percent of nicotine extracted into the humectant with different grades of Laponite at different experimental conditions. Water and heat accelerate nicotine extraction into the humectant solution.

Figure 7:
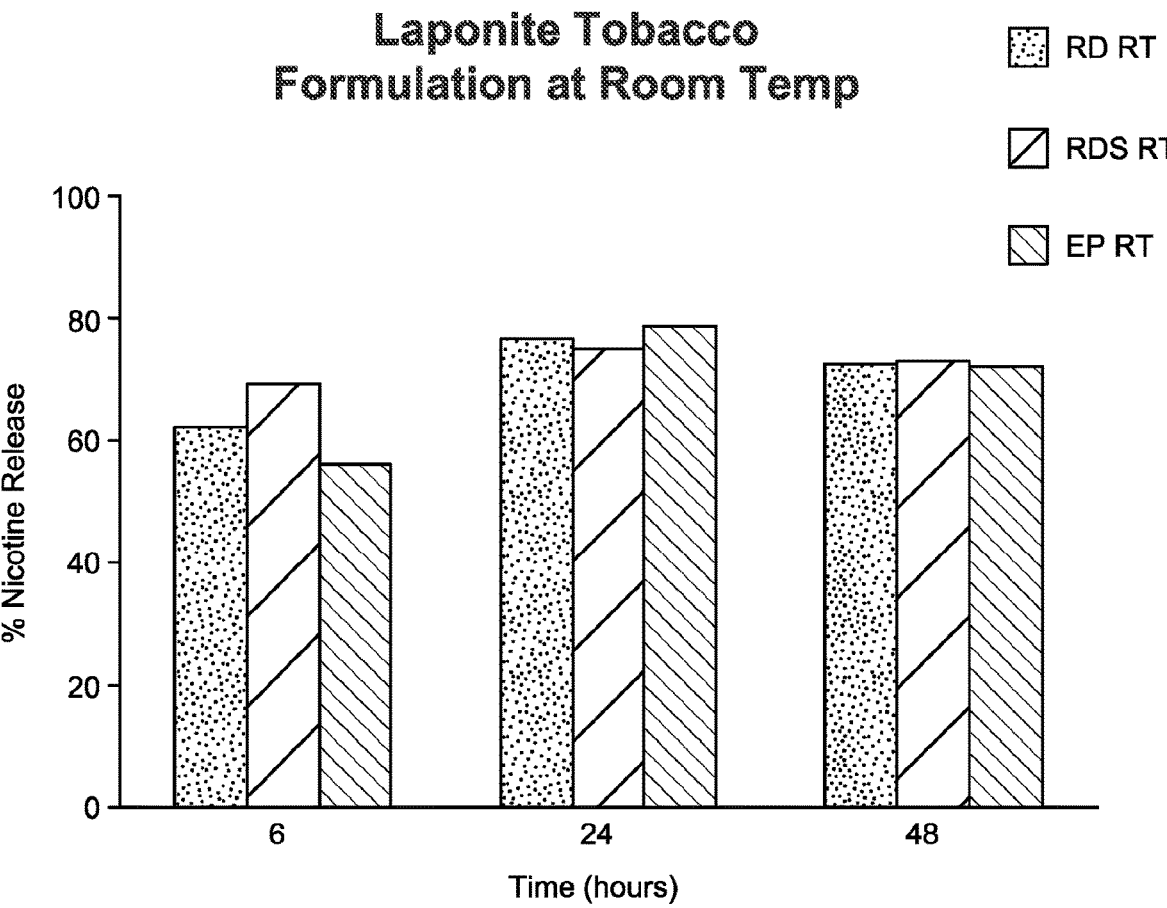
FIG. 7 is a graph presenting the percent of nicotine extracted for Examples 1, 2, and 3 at room temperature.

FIG. 7 shows a table of pH data for multiple chemicals and compositions. While the second solution containing the humectant is acidic, the localized pH value of the tobacco material and hydrated ionic clay compositions remains basic. The tobacco material and hydrated ionic clay compositions did not make the entire solution basic. This avoids irritation in the throat while puffing as the pH did not change to basic. The final vaporizable material solution should be at least mildly acidic (i.e., <7), and preferably the pH>4. An example target range of the final vaporizable material solution is a pH value of about 5 to 7.

Example 1. Method for Extraction of Nicotine from Tobacco Material-Hydrated Ionic Clay Formulation (EP) at Room Temperature Approximately 0.4 g of Laponite EP (procured from BYK Additives Inc.) was added to 20 g of distilled deionized water at 70° C. while constantly stirring. Once the Laponite was fully dissolved or dispersed, the viscosity of the water significantly increased and eventually formed a sol/gel structure. To 20.4 g of the sol/gel, 6.0 g of finely powdered tobacco material (Burley, particle size ranging from 100-500 microns), was added and mixed on high shear mixer at 2000 rpm for 5 minutes until a homogeneous dispersion of tobacco material with paste like consistency was accomplished. The tobacco material particles suspended in gel structure were partially dehydrated (optionally) until the final concentration of the water in the formulation is less than 40% (as determined by Karl Fischer titration). Partially dried tobacco material-Laponite gel matrix containing less than 40% of water was compressed into a cylindrical pellet form using a 1-2 ton press. However, the pellet shape could be altered to any shape or form or a powdered form could be used. Alternately, the pellet form could be directly printed using an XYZ table. The tobacco material-Laponite powder weighing approximately 300 mg were gently placed into a propylene glycol, vegetable glycerin, and water mixture (approximate ratio 60:30:10) in 4.2 ml of liquid. The release of nicotine from the from tobacco Laponite mixture at room temperature was measured using LC-MS. The nicotine released varied anywhere from 55% to 80% by mass based on experimental conditions employed (i.e., time, temperature and solvent ratios).

Example 2. Method for Extraction of Nicotine from Tobacco Material-Hydrated Ionic Clay Formulation (RD) at Room Temperature Approximately 0.4 g of Laponite RD (procured from BYK Additives Inc.) was added to 20 g of distilled deionized water at 70° C. while constantly stirring. Once the Laponite was fully dissolved or dispersed, the viscosity of the water significantly increased and eventually formed a sol/gel structure. To 20.4 g of the sol/gel, 6.0 g of finely powdered tobacco material (Burley, particle size ranging from 100-500 microns), was added and mixed on high shear mixer at 2000 rpm for 5 minutes until a homogeneous dispersion of tobacco material with paste like consistency was accomplished. The tobacco material particles suspended in gel structure were partially dehydrated (optionally) until the final concentration of the water in the formulation is less than 40% (as determined by Karl Fischer titration). Partially dried tobacco material-Laponite gel matrix containing less than 40% of water was compressed into a cylindrical pellet form using a 1-2 ton press. However, the pellet shape could be altered to any shape or form or could be used in powdered form. Alternately, the pellet form could be directly printed using an XYZ table. The tobacco material-Laponite powder weighing approximately 300 mg were gently placed into propylene glycol, vegetable glycerin, and water mixture (approximate ratio 60:30:10) in 4.2 ml of liquid. The release of nicotine from the from tobacco Laponite mixture at room temperature was measured using LC-MS. The nicotine released varied anywhere from 60% to 80% by mass based on experimental conditions employed (i.e., time, temperature and solvent ratios).

Example 3. Method for Extraction of Nicotine from Tobacco Material-Hydrated Ionic Clay Formulation (RDS) at Room Temperature Approximately 0.4 g of Laponite RDS (procured from BYK Additives Inc.) was added to 20 g of distilled deionized water at 70° C. while constantly stirring. Once the Laponite was fully dissolved or dispersed, the viscosity of the water significantly increased and eventually formed a sol/gel structure. To 20.4 g of the sol/gel, 6.0 g of finely powdered tobacco material (Burley, particle size ranging from 100-500 microns), was added and mixed on high shear mixer at 2000 described above. The amount of nicotine released after 6 hours was about 60%±5% by mass for each of the Laponite RD, RDS, and EP formulations. After 24 hours, the amount of nicotine extracted was about 80%±5% by mass for each of the Laponite RD, RDS, and EP formulations. After 48 hours extraction, there were minimal changes for each of the three Laponite grades.

Example 4. Method for Extraction of Nicotine from Tobacco Material-Hydrated Ionic Clay Formulations (EP, RD, and RDS) at Elevated Temperature (70° C.)

Figure 8:
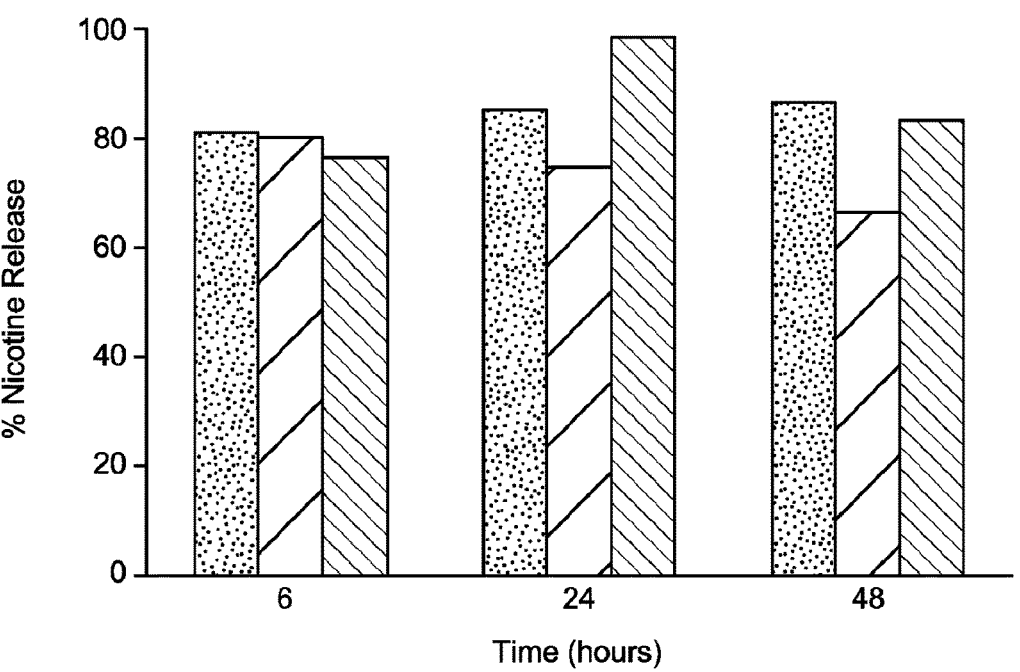
FIG. 8 is a graph presenting the percent of nicotine extracted for Example 4 at a temperature of 70° C.

All the tobacco clay formulations given in Examples 1, 2, and 3 were extracted into same solvents (as in given Examples 1, 2, and 3) at 70° C. to study the effect of temperature on nicotine release. FIG. 8 is a graph presenting the percent of nicotine extracted for Example 4 at a temperature of 70° C. The amount of nicotine released after 6 hours was about 80%±5% by mass for each of the Laponite RD, RDS, and EP formulations. After 24 hours, the amount of nicotine extracted was between about 75% and 100% by mass for each of the Laponite RD, RDS, and EP formulations. After 48 hours extraction the amount of nicotine extracted was between about 65% and 90% by mass for each of the Laponite RD, RDS, and EP formulations.

The results of all the extraction studies at both room temperature and 70° C. are summarized in Table 1, below.

TABLE 1

| Tobacco Material-Hydrated Ionic Clay Formulations | | | | | |
|---|---|---|---|---|---|
| TOB- RD (2%) % Nicotine release | | TOB- RDS (2%) % Nicotine release | | TOB- EP (2%) % Nicotine release | |
| Time (Hours) | TOB-RD 2% RT (n = 3) | TOB-RD 2% 70 C. (n = 3) | TOB-RDS 2% RT (n = 3) | TOB-RDS 2% 70 C. (n = 3) | TOB-EP 2% RT (n = 3) | TOB-EP 2% 70 C. (n = 3) |
| 6 | 63.62 | 82.57 | 70.63 | 81.92 | 57.44 | 77.94 |
| 24 | 78.22 | 87.07 | 76.47 | 76.19 | 80.19 | 100.7 |
| 48 | 74.06 | 88.52 | 74.25 | 67.87 | 73.63 | 84.92 |

RT—Room temperature (~25° C.)
Laponite grades—RD, RDS and EP
TOB—tobacco
All the results are the average of three replicates (n = 3).

rpm for 5 minutes until a homogeneous dispersion of tobacco material with paste like consistency was accomplished. The tobacco material particles suspended in gel structure were partially dehydrated (optionally) until the final concentration of the water in the formulation is less than 40% (as determined by Karl Fischer titration). Partially dried tobacco material-Laponite gel matrix containing less than 40% of water was compressed into a cylindrical pellet form using a 1-2 ton press. However, the pellet shape could be altered to any shape or form or could be used in powdered form. Alternately, the pellet form could be directly printed using an XYZ table. The tobacco material-Laponite powder weighing approximately 300 mg were gently placed into Propylene Glycol, Vegetable Glycerin, and Water mixture (approximate ratio 60:30:10) in 4.2 ml of liquid. The release of nicotine from the from tobacco Laponite mixture at room temperature was measured using LC-MS. The nicotine released varied anywhere from 60% to 80% by mass based on experimental conditions employed (i.e., time, temperature and solvent ratios).

Figure 9:
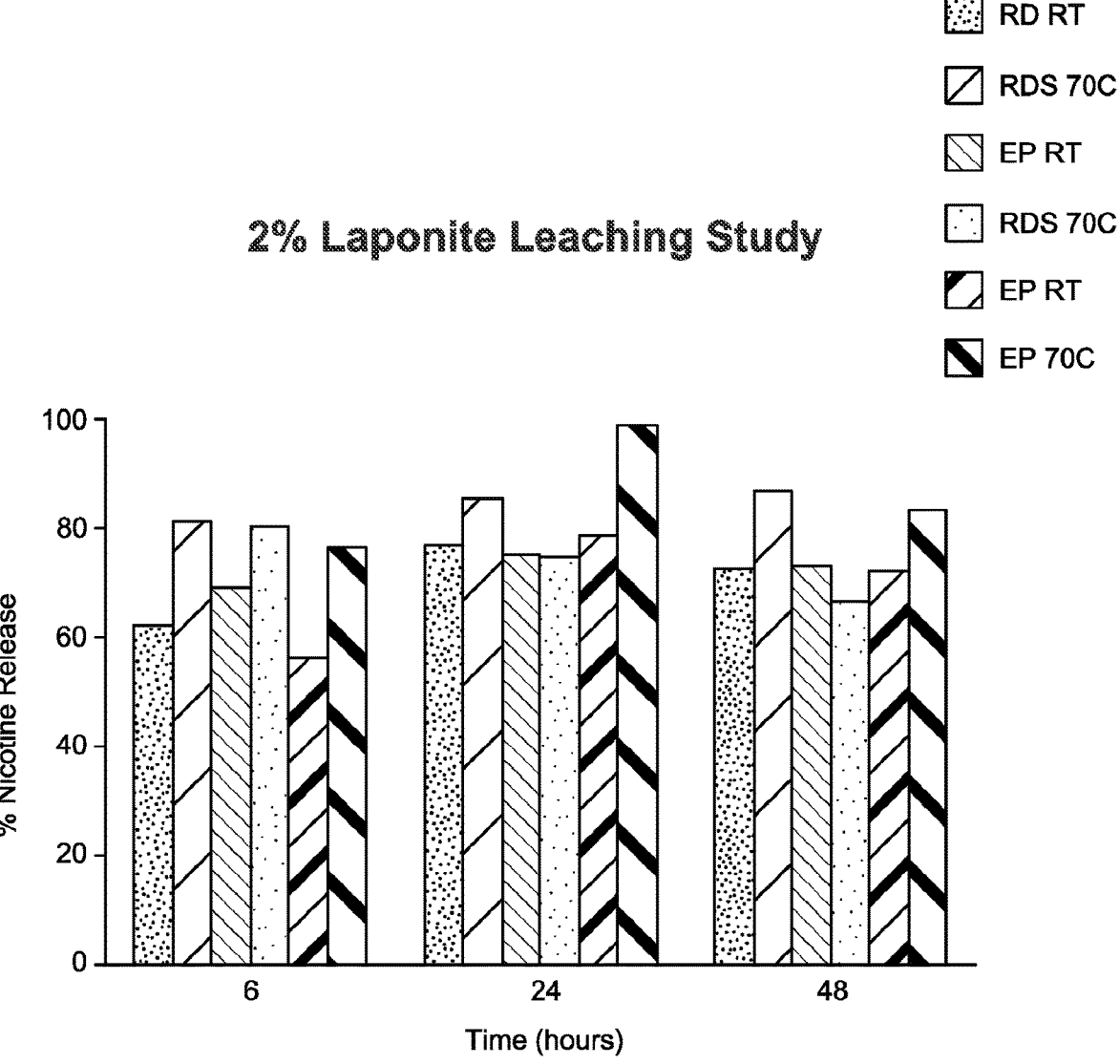
FIG. 9 is a graph presenting the percent of nicotine extracted into solution of PG/VG for several grades of Laponite at room temperature and 70° C.

FIG. 7 is a graph presenting the percent of nicotine extracted for Examples 1, 2, and 3 at room temperature as FIG. 9 is a graph presenting the percent of nicotine extracted into solution of PG/VG for several grades of Laponite at room temperature and 70° C. Increasing the temperature tended to increase the rate of extraction for the given formulation and duration.

Example 5. TGA-MS on Tobacco Material-Hydrated Ionic Clay Formulations

The formulations given in Examples 1, 2, and 3 were heated on TGA-MS (Thermogravimetric Analysis/Mass Spectrometry). All of them demonstrated nicotine release at low temperatures compared to control and competition.

Example 6. Heating of Tobacco Material-Hydrated Ionic Clay Pellets (RD)

Approximately 0.4 g of Laponite RD (procured from BYK Additives Inc.) was added to 20 g of distilled deionized water at 60° C. while constantly stirring. Once Laponite RD was fully dissolved or dispersed, the viscosity of the water significantly increased and eventually formed a sol/gel structure. To 20.4 g sol/gel, 6.0 g of finely powdered Tobacco (Burley, particle size ranges from 100-500 microns), was added and rigorously agitated until a homogeneous dispersion of tobacco with paste like consistency is accomplished. The tobacco particles suspended in tobacco were partially dehydrated until the final concentration of the water in the formulation is less than 40% (as determined by Karl Fisher). Partially dried tobacco-Laponite gel matrix containing less than 40% of water was compressed into a cylindrical pellet form using a 1-2 ton press. However, the pellet shape could be altered to any shape or form. Alternately, the pellet form could be directly printed using an XYZ table. Weighed approximately 80 mg±10% pellets and wetted with humectants. Wetted pellets were placed heated to 200° C. in an oven and heated for 2 minutes (without any airflow). The nicotine aerosolized was measured by what was left in pellet using GC-FID. More than 15% nicotine release was observed after 2 minutes.

Example 7. Heating of Tobacco Material-Hydrated Ionic Clay Pellets (RDS)

Approximately 0.4 g of Laponite RDS (procured from BYK Additives Inc.) was added to 20 g of distilled deionized water at 60° C. while constantly stirring. Once Laponite RDS was fully dissolved or dispersed, the viscosity of the water significantly increased and eventually formed a sol/gel structure. To 20.4 g sol/gel, 6.0 g of finely powdered Tobacco (Burley, particle size 100-500 microns), was added and rigorously agitated until a homogeneous dispersion of tobacco with paste like consistency is accomplished. The tobacco pellet was partially dehydrated until the final concentration of the water in the formulation is less than 40% (as determined by Karl Fisher). Partially dried tobacco-Laponite gel matrix containing less than 40% of water was compressed into a cylindrical pellet form using a 1-2 ton press. Pellets were wetted with humectants (approximately 80 mg±10% pellets and wetted with humectants). Wetted pellets were heated to 200° C. (no air flow). The nicotine aerosolized was measured by what was left in pellet using GC-FID. More than 20% nicotine release was observed after 2 minutes.

Figure 10:
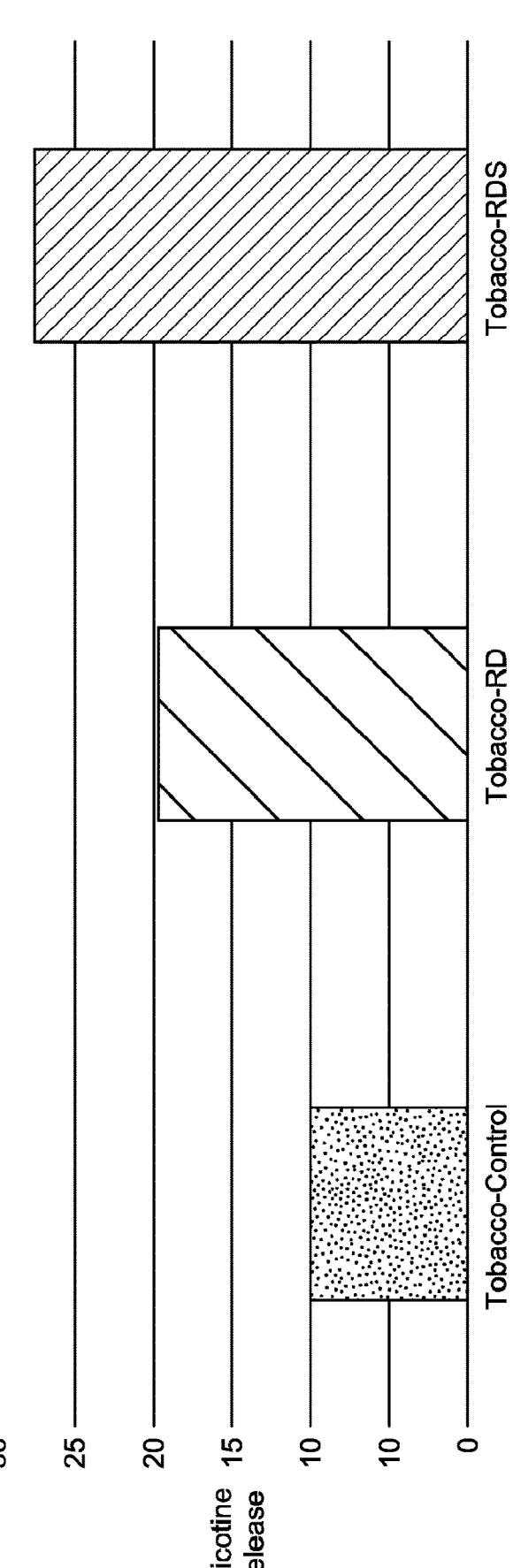
FIG. 10 is a graph presenting the percent of nicotine vaporized for Examples 6 and 7 at a temperature of 200° C.

FIG. 10 is a graph presenting the percent of nicotine vaporized for Examples 6 and 7 at a temperature of 200° C. Both hydrated ionic clay and tobacco material compositions released more than 2 to 2.5 times more nicotine than the tobacco control after two minutes.

Terminology

"Hydrated ionic clay" as set forth herein refers to a composition including one or more inorganic polymer layers (e.g. a clay mineral or phyllosilicate) and one or more alkali metals (e.g. sodium or magnesium) in a layered structure and is capable of forming a viscous suspension or dispersion with water.

"Water" as set forth herein refers to both bound and free water within a given composition or formulation.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

As used herein in the specification and claims, all ratios are determined on a mass/mass basis.

Although various illustrative embodiments are described above, any of a number of changes may be made to various embodiments without departing from the teachings herein. For example, the order in which various described method steps are performed may often be changed in alternative embodiments, and in other alternative embodiments, one or more method steps may be skipped altogether. Optional features of various device and system embodiments may be included in some embodiments and not in others. Therefore, the foregoing description is provided primarily for exemplary purposes and should not be interpreted to limit the scope of the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A composition comprising:
   a gel matrix comprising a hydrated ionic clay and a tobacco material; and
   a solution comprising a solvent configured to extract nicotine from the tobacco material, wherein the gel matrix is immersed in the solution.

2. The composition of claim 1, wherein the hydrated ionic clay is between 1 wt % to 10 wt % of the gel matrix.

3. The composition of claim 1, wherein the tobacco material is between 20 wt % to 95 wt % of the gel matrix.

4. The composition of claim 1, wherein the hydrated ionic clay is a gel forming grade or a sol forming grade.

5. The composition of claim 1, wherein the hydrated ionic clay is Laponite.

6. The composition of claim 1, wherein the solution further comprises an organic acid, a flavoring agent, or both.

7. The composition of claim 1, wherein the tobacco material is a pure tobacco or a tobacco blend.

8. The composition of claim 1, wherein
   the hydrated ionic clay is between 0.1 wt % to 5 wt % of the gel matrix, and
   the tobacco material is between 20 wt % to 95 wt % of the gel matrix.

9. The composition of claim 1, wherein the tobacco material has a particle size distribution ranging from 50 to 5000 microns.

10. The composition of claim 1, wherein the gel matrix is formed as a pellet, brick, bead, tablet, plug, cylinder, or porous rod.

11. The composition of claim 1, wherein the gel matrix retains its shape within the solution.

12. The composition of claim 1, wherein the solution has a pH between 3 and 7.

13. The composition of claim 1, wherein a ratio of the tobacco material to the hydrated ionic clay is from 1:1 to 15:1.

14. The composition of claim 1, wherein 60% to 80% by mass of nicotine is released from the gel matrix into the solution.

15. The composition of claim 1, wherein the solvent comprises a humectant.

16. The composition of claim 15, wherein the humectant is vegetable glycerol, propylene glycol, or a combination thereof.

17. The composition of claim 15, wherein the solvent further comprises water.

18. The composition of claim 17, wherein the solution comprises propylene glycol, vegetable glycerol, and water at a ratio of 60:30:10.

19. The composition of claim 16, wherein a ratio of vegetable glycerol to propylene glycol is from 100:0 to 50:50.

20. The composition of claim 16, wherein a ratio of vegetable glycerol to propylene glycol is from 50:50 to 100:0.

* * * * *